Oct. 29, 1968  S. GEORGE  3,408,491
HEADLIGHT LENS
Original Filed March 1, 1965
2 Sheets-Sheet 1
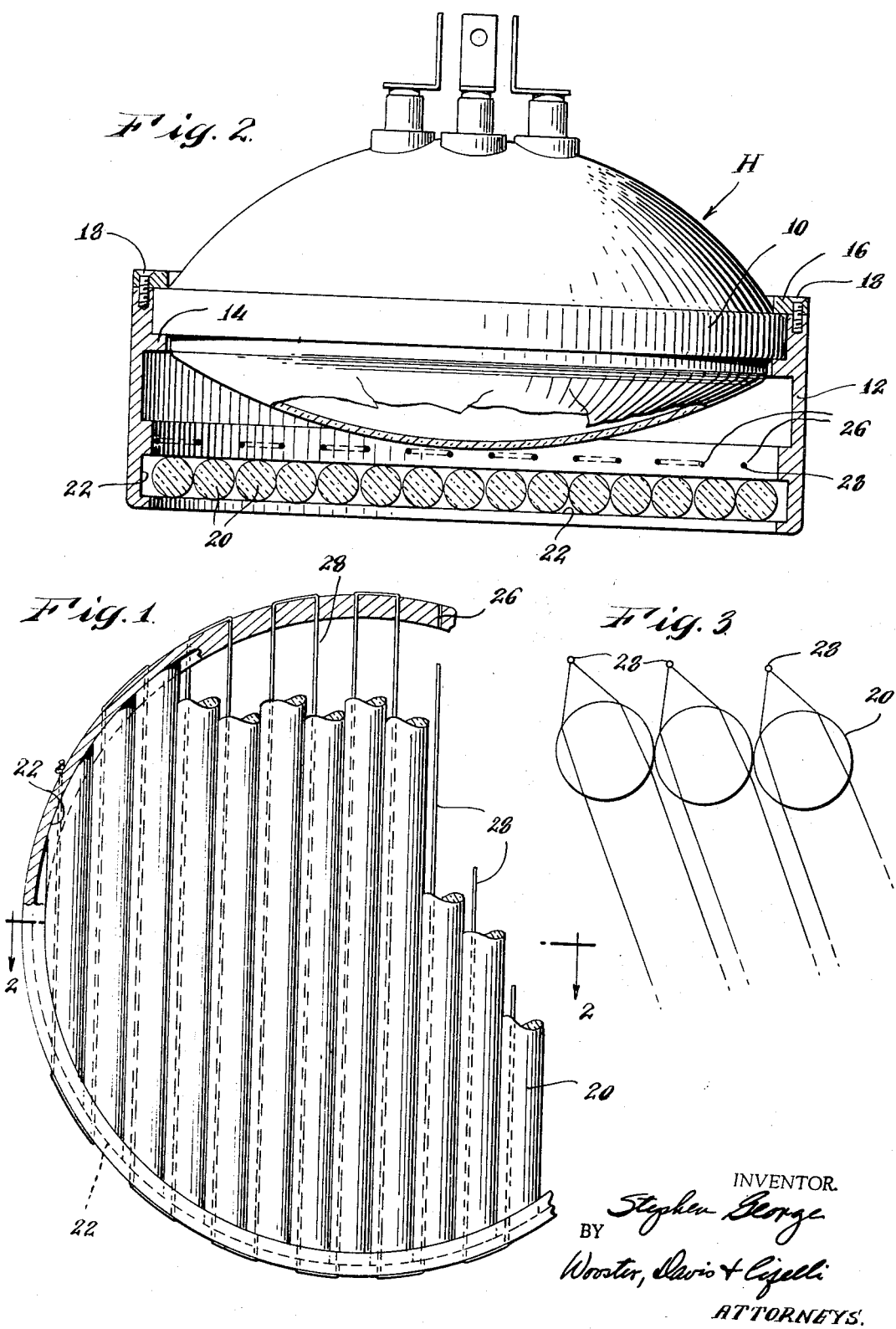

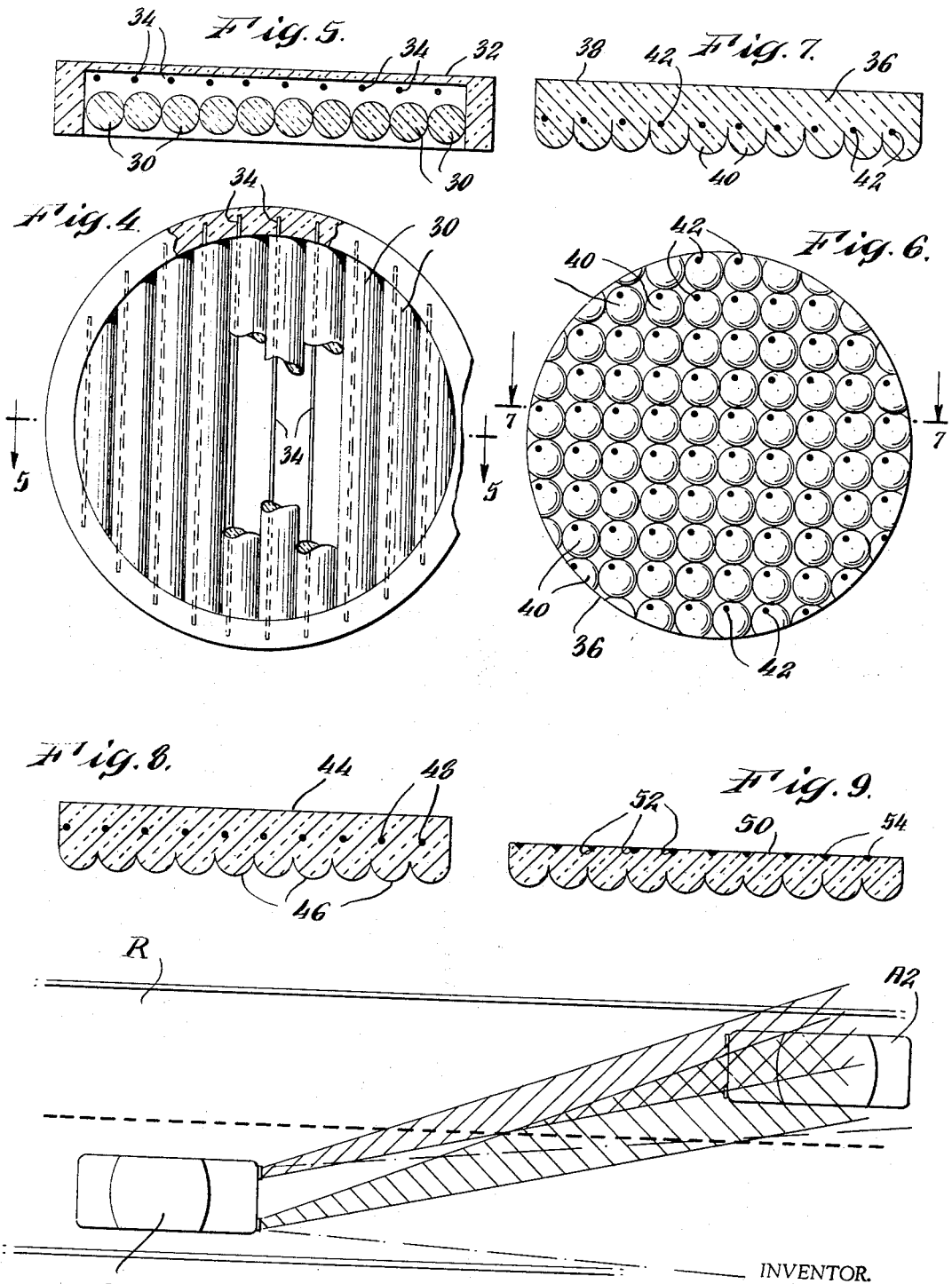

United States Patent Office 3,408,491
Patented Oct. 29, 1968

3,408,491
HEADLIGHT LENS
Stephen George, deceased, late of Easton, Conn., by City Trust Co., Inc., executor, 916 Main St., Bridgeport, Conn. 06603
Continuation of application Ser. No. 435,818, Mar. 1, 1965. This application July 28, 1967, Ser. No. 688,630
10 Claims. (Cl. 240—41.4)

ABSTRACT OF THE DISCLOSURE

A lens for positioning before an automobile headlight to reduce glare to one side. The lens comprises a single plane of refracting elements which are partially circular in horizontal cross section. Between the plane and the light source are a number of at least partially opaque objects. In the case of cylindrical refracting elements, these may be cords or wires. Each object is associated with one of the refracting members and is positioned at its focal point on a line extending through the center of curvature of the element in the direction in which glare is to be reduced.

---

This application is a continuation of the copending application of Stephen George, deceased, for patent for Headlight Lens, filed in the U.S. Patent Office Mar. 1, 1965, Ser. No. 435,818, now abandoned.

This invention relates to a lens having reduced glare and more particularly to such a lens wherein the glare is reduced along a preselected axis from the lens.

One of the problems encountered in driving an automobile at night is the glare produced by the headlights of an oncoming car. This glare appears to gradually increase as the oncoming automobile approaches until the two automobiles are fairly close together. The glare then decreases rapidly as the automobile passes. The glare is most pronounced when the headlight beams are raised but is also present when the beams are lowered. The glare is not only annoying but is a serious safety problem. The drivers are temporarily blinded by the glare itself and the effects continue until the eyes have readapted themselves to darkness. It would, therefore, be highly desirable to reduce the glare impinging on an approaching car while not reducing the amount of light cast onto the roadway directly ahead.

Accordingly, it is the primary object of this invention to provide an improved lens for a light. Other objects are to provide such a lens which substantially reduces glare within a specified portion of the light beam while allowing light in other portions to pass substantially unaffected.

The manner in which the objects of this invention are achieved will be more apparent from the following description, the appended claims and the figures of the attached drawings wherein:

FIG. 1 is a front view of a headlight lens constructed in accordance with the invention, partially broken away to illustrate its construction;

FIG. 2 is a cross-section taken along the line 2—2 of FIG. 1;

FIG. 3 is an enlarged optical schematic illustrating the manner in which the invention functions;

FIG. 4 is a front view of a modification of the lens of the invention;

FIG. 5 is a cross-section taken along the line 5—5 of FIG. 4;

FIG. 6 is a front view of still another modification of the invention;

FIG. 7 is a cross-section taken along the line 7—7 of FIG. 6;

FIG. 8 is a cross-section illustrating another modification of the invention;

FIG. 9 is a cross-section illustrating still another modification of the invention; and FIG. 10 is an illustration of the operation of the lens of the invention as an automobile headlight lens.

In accordance with the invention there is provided a lens comprising a plurality of refracting elements, each refracting element having associated therewith an opaque or partially opaque object arranged to obstruct a portion of the light emitted by the lens along a preselected axis.

In FIGS. 1 and 2 there is illustrated a lens in accordance with this invention mounted on a standard automobile headlamp H having an encircling raised flange 10. The lens comprises a generally cylindrical metal frame 12 having an internally extending annular shoulder 14 which fits against the front of the flange 10, the lens being secured thereto by means of a retainer ring 16 mounted on the frame by means of screws 18. Mounted within the open front end of the frame 12 are a plurality of refracting elements in the form of cylindrical glass rods 20 vertically arranged in side by side relationship. The ends of these rods are seated in a suitable annular recess 22, extending around the opening in frame 12. The frame also defines a plurality of small positioning holes 26 which are arranged behind the recess 22. Each of the holes 26 is arranged behind one of the rods 20 but is offset from its center line. The holes are vertical and each hole around the upper half of frame 12 is aligned with a similar hole in the lower half. Threaded through the holes 26 is a wire 28. The wire is threaded from each of the holes in one half of the frame through its counterpart in the other half, is continued around the frame 12 to the next hole and so forth as illustrated in FIGS. 1 and 2.

It is well known that collimated light impinging on a cylindrical lens is focused along a line parallel to the cylindrical axis and displaced from the back surface a distance equal to the radius. In the present invention, the reverse effect is utilized and the opaque wire 28 is positioned along the focal line. Thus, each of the glass rods 20 is an individual refracting element and each of the wires 28 casts a magnified shadow through its corresponding rod along the direction established by a line passing between the wire 28 and the center of its rod 20. This is illustrated most clearly in FIG. 3. However, it will be noted that light passing directly forward through the lens is not substantially reduced or otherwise affected by the presence of the wire 28.

In FIG. 10 there is illustrated a road R and a first automobile $A_1$ equipped with headlamps having lenses constructed in accordance with this invention. From this illustration it will be noted that each of the headlamps casts a partial shadow along the left side portion of its beam. The angle of the shadow is adjusted by the placement of the wires 28 behind the rods 20 and is selected to provide maximum anti-glare protection to the driver of the oncoming automobile $A_2$.

As explained above, each of the wires 28 should be positioned from its rod 20 a distance equal to the radius of the rod for maximum effectivenes. However, slight variations from this distance may be permitted without materially affecting the operation.

Although particularly described above for use with automobile headlamps, the invention is not so limited but may equally well be applied to flashlights, searchlights, etc., wherever its characteristics may be desired.

There is illustrated in FIGS. 4 and 5 a construction which operates in a similar principle to that described above. However, in this arrangement glass rods 30 are mounted (as by cementing) within a glass or plastic cup-shaped frame 32, which functions both as a frame and also as a "window" for the light. In this arrangement the wires 34 are relatively stiff and their ends are embedded directly into the material of frame 32.

In FIGS. 6 and 7 there is illustrated a variation comprising a unitary lens 36 having a planar rear surface 38, its front surface forming a plurality of semi-spherical nodules 40 which serve the same function and replace the refracting elements previously described. Enclosed within the material of the lens 36 and associated with each of the nodules 40 is an opaque dot 42 which may be of any suitable material for casting the desired shadow.

In FIG. 8 there is illustrated in cross-section a lens 44 having its front surface formed in semi-cylindrical ridges 46. Embedded in the lens 44 and behind each of the ridges 46 is a wire 48. In FIG. 9 a somewhat similar arrangement is disclosed wherein a lens 50 has its front surface formed in semi-cylindrical ridges and its back surface defines triangular grooves 52, each of which is filled with an opaque paint 54.

It will thus be seen that by means of this invention there is provided a novel advance in the art of forming lenses for lights and more particularly in the formation of automobile headlights. By means of this invention, a lens may be constructed which is substantially glare-free along a preselected axis. It will also be apparent that many variations are possible in the present invention without departing from its spirit and scope. For example, the invention has been described as using opaque shadow-producing objects. However, it may be desirable to use partially opaque wires, cords, or dots and even to use translucent colored cords, strings and similar arrangements. Accordingly, the foregoing description is to be construed as illustrative only, rather than limiting. This invention is limited only by the scope of the following claims.

What I claim as new and desire to secure by Letters Patent of the United States is:

1. A lens having no-glare properties along a preselected axis which comprises: a plurality of light focusing refracting members positionable before a light source, said single plane comprising the only refracting elements of said lens, each of said members being at least partially circular in horizontal transverse cross-section; and a plurality of at least partially opaque nonplanar object means between said refracting members and said light source, each of said object means being associated with one of said refracting members and positioned substantially solely along the extension of said axis through the center of curvature of its associated refracting member and substantially at its focal point.

2. The lens of claim 1 wherein said light refracting members are cylinders arranged in side by side relationship.

3. The lens of claim 2 wherein each of said object means has the form of an elongated strand parallel to the longitudinal axis of its corresponding refracting member.

4. The lens of claim 3 wherein the distance between each strand and the surface of its corresponding refracting member is substantially equal to the cross sectional radius of said member.

5. The lens of claim 1 wherein said lens is a unitary, transparent, substantially flat article and wherein said refracting members are projections formed on the outer major surface of said article.

6. The lens of claim 5 wherein said refracting members are substantially semicylindrical ridges.

7. The lens of claim 6 wherein said object means are elongated strands imbedded in said article.

8. The lens of claim 6 wherein said object means are elongated strips on the inner major surface of said article.

9. The lens of claim 5 wherein said refracting members are substantially semispherical.

10. The lens of claim 9 wherein said object means are dots imbedded in said article.

References Cited

UNITED STATES PATENTS 2,933,595  4/1960  Tabouret.

FOREIGN PATENTS 639,774  12/1936  Germany.
929,959  6/1963  Great Britain.

RICHARD SHEER, *Assistant Examiner.*

NORTON ANSHER, *Primary Examiner.*